United States Patent
Lee et al.

(10) Patent No.: US 11,187,568 B2
(45) Date of Patent: Nov. 30, 2021

(54) CURB FOR MEASURING FLOOD DEPTH IN URBAN AREA

(71) Applicant: The Republic of Korea as Represented by National Disaster Management Research Institute, Ulsan (KR)

(72) Inventors: Han Seung Lee, Ulsan (KR); Jae Seung Joo, Ulsan (KR); Jae Woong Cho, Ulsan (KR); Chang Won Choi, Ulsan (KR); Ho Seon Kang, Gyeongju-si (KR); Chang Yeon Bae, Ulsan (KR); Jeong Geun Hwang, Yangsan-si (KR)

(73) Assignee: THE REPUBLIC OF KOREA (NATIONAL DISASTER MANAGEMENT RESEARCH INSTITUTE), Ulsan (KR)

( * ) Notice: Subject to any disclaimer, the term of this patent is extended or adjusted under 35 U.S.C. 154(b) by 0 days.

(21) Appl. No.: 16/608,151

(22) PCT Filed: Nov. 7, 2018

(86) PCT No.: PCT/KR2018/013462
§ 371 (c)(1),
(2) Date: Oct. 24, 2019

(87) PCT Pub. No.: WO2020/096082
PCT Pub. Date: May 14, 2020

(65) Prior Publication Data
US 2021/0255022 A1    Aug. 19, 2021

(30) Foreign Application Priority Data
Nov. 6, 2018 (KR) .......................... 10-2018-0135293

(51) Int. Cl.
*G01F 23/18* (2006.01)
*G01F 23/26* (2006.01)
(Continued)

(52) U.S. Cl.
CPC ............ *G01F 23/18* (2013.01); *E01C 11/222* (2013.01); *G01F 23/268* (2013.01); *G01F 25/0069* (2013.01)

(58) Field of Classification Search
CPC ............. G01F 25/0061; G01F 25/0069; G01F 25/0076
See application file for complete search history.

(56) References Cited

U.S. PATENT DOCUMENTS

| | | | | |
|---|---|---|---|---|
| 6,142,017 A | * | 11/2000 | Glassey | G01F 23/16 73/299 |
| 9,576,463 B2 | * | 2/2017 | Walbert | G08B 21/182 |

(Continued)

FOREIGN PATENT DOCUMENTS

| | | | | |
|---|---|---|---|---|
| GB | 2578564 A | * | 5/2020 | ........... G01F 15/007 |
| JP | 2017181054 A | * | 10/2017 | |

(Continued)

*Primary Examiner* — Herbert K Roberts

(57) ABSTRACT

The present invention provides a curb for measuring the flood depth in an urban area, more particularly, to a curb for measuring the flood depth in an urban area, which is configured to demarcate the boundary between a vehicular roadway and a pedestrian sidewalk to measure the flood depth so that the flood depth in the urban area can be measured without the necessity for additional installation of a separate structure. In particular, the present invention has an effect in that an air contact type water level gauge is installed in a first space of a main body to measure the flood depth, i.e., the level of flooding water based on the internal air pressure of a cylindrical tube so that a pressure sensor is not brought into close contact with the flooding water to (Continued)

prevent corrosion of the pressure sensor, thereby reducing the maintenance and repair costs.

5 Claims, 5 Drawing Sheets

(51) Int. Cl.
*G01F 25/00* (2006.01)
*E01C 11/22* (2006.01)

(56) References Cited

U.S. PATENT DOCUMENTS

| | | | | |
|---|---|---|---|---|
| 2006/0103393 | A1* | 5/2006 | Stahlmann | G01F 23/268 324/658 |
| 2010/0263458 | A1* | 10/2010 | Irving | G01F 23/26 73/863.01 |
| 2011/0056289 | A1* | 3/2011 | Senghaas | G01F 23/243 73/170.21 |
| 2014/0049396 | A1* | 2/2014 | Walbert | G01F 23/64 340/624 |
| 2014/0350862 | A1* | 11/2014 | Bond | G01F 23/00 702/19 |
| 2017/0234717 | A1* | 8/2017 | Tsuboi | G01F 1/661 73/291 |
| 2017/0292839 | A1* | 10/2017 | Lin | G01F 1/05 |
| 2017/0299416 | A1* | 10/2017 | Rondano | G01F 23/265 |
| 2018/0089981 | A1* | 3/2018 | Walbert | G08B 21/10 |
| 2019/0128726 | A1* | 5/2019 | Zorzetto | G01F 23/268 |
| 2019/0197892 | A1* | 6/2019 | Watson | G08G 1/095 |
| 2020/0033178 | A1* | 1/2020 | Hanna | G01F 23/268 |
| 2020/0064175 | A1* | 2/2020 | Krammer | G01F 23/167 |

FOREIGN PATENT DOCUMENTS

| | | | |
|---|---|---|---|
| JP | 2019031774 A | * | 2/2019 |
| KR | 10-1019817 | | 3/2011 |
| KR | 10-1178843 | | 9/2012 |
| KR | 101178843 B1 | * | 9/2012 |
| KR | 10-1202841 | | 11/2012 |
| KR | 101202841 B1 | * | 11/2012 |
| KR | 10-1673768 | | 11/2016 |
| KR | 10-1775016 | | 8/2017 |

* cited by examiner

CURB FOR MEASURING FLOOD DEPTH IN URBAN AREA

TECHNICAL FIELD

The present invention relates to a curb for measuring the flood depth in an urban area, more particularly, to a curb for measuring the flood depth in an urban area, which is configured to demarcate the boundary between a vehicular roadway and a pedestrian sidewalk to measure the flood depth so that the flood depth in the urban area can be measured without the necessity for additional installation of a separate structure.

BACKGROUND ART

In recent years, prediction of disasters caused by climate changes due to the global warming phenomenon has become more difficult as time passes, and global damage of the disasters has also increased sharply. In addition, along with the development of road networks, travel time reduction and accessibility according to movement across regions is improved, but the occurrence frequency and damage scale of accidents such as submersion of road networks and fires or vehicle collisions are increasing rapidly.

In particular, since catastrophes and accidents lead to direct primary damages as well as secondary damages that may occur subsequently to cause more serious conditions, a disaster prevention system is required which allows people approaching the occurrence regions of catastrophes and accidents to promptly grasp information on the occurrence of the catastrophes and accidents to cope with them rapidly so that the spread of damages can be prevented.

In general, in the rainy season during which a large amount of rain falls, areas subject to flood damage are created. Particularly, areas of land that are low experience repeated flood damage. Similarly, a lot of zones flooded repeatedly by inundation or backwater are also formed on roads on which vehicles travel.

However, the recent trend of rainfall in the rainy season suggests that a large amount of rain does not fall continuously over a long period of time, but torrential rain pouring suddenly for a long period of time increases. Such heavy rain trend results in damage of many flooded vehicles on, particularly roads in the lowland areas.

For example, there occur cases where in in such abrupt heavy rain conditions, before road safety guards block a road in a lowland area in advance, vehicles having entered the road are isolated in the middle of the road so that they suffer flood damage.

In other words, there occur many cases where the road has started to be flooded already before road safety guards detect a danger and block the entry of vehicles into the road due to heavy torrential rain. Vehicles having first entered the road do not escape from the middle region of the road, but suffer flood damage as they are, which may cause a danger to lives of the vehicle drivers as well as the vehicles. Therefore, there is a need for a disaster prevention system that can more rapidly cope with flooded road conditions.

Various technologies have been proposed to identify the flooded road conditions. Korean Patent Registration No. 10-1092093 (registered on Dec. 2, 2011) discloses a street lamp including a flood sensing apparatus configured such that a raindrop detection sensor, a rainfall measurement sensor, and a supersonic water level sensor are organically operated in cooperation with one another to detect the state of a flooded road so that the efficiency of power used and the accuracy of flood detection can be increased as well as the flooded road conditions can be monitored in real-time as shown in FIG. 1.

However, the above-described conventional technology entails a problem in that the flood sensing apparatus is configured in the form of a streetlight so that an separately independent structure is required to be installed, leading to increases in inconvenience of the installation and installation costs, and the flooded road conditions based on the geographical features, especially the altitude of a relevant road cannot be accurately grasped, leading to a deterioration in reliability.

DISCLOSURE OF INVENTION

Technical Problem

Accordingly, the present invention has been made in order to solve the above-described problems occurring in the prior art, and it is an object of the present invention is to provide a novel type curb for measuring the flood depth in an urban area, which is configured to demarcate the boundary between a vehicular roadway and a pedestrian sidewalk to measure the flood depth so that the flood depth in an urban area can be measured without the necessity for additional installation of a separate structure.

Particularly, another object of the present invention is to provide a novel type curb for measuring the flood depth in an urban area, in which an air contact type water level gauge is installed in a first space of a main body to measure the flood depth, i.e., the level of flooding water based on the internal air pressure of a cylindrical tube so that a pressure sensor is not brought into close contact with the flooding water to prevent corrosion of the pressure sensor, thereby reducing the maintenance and repair costs.

Technical Solution

To achieve the above objects, the present invention provides a curb for measuring the flood depth in an urban area, including: a main body 20 configured to be divided into a first space 22 and a second space 23 by a partition member, the first space 22 being opened at a top portion thereof, a bottom portion thereof and one side of a front portion thereof, which fluidically communicate with one another, the second space 23 being opened at a top portion thereof, and the first space 22 and the second space 23 being partitioned by the partition member 21; a water level gauge 30 disposed in the first space 22 of the main body 20 and configured to measure the level of water flooding into the first space 22 through the opened bottom portion of the first space 22 and the opened one side of the front portion of the first space 22; a control unit 40 disposed in the second space 23 of the main body 20, and configured to store the level of the flooding water, measured by the water level gauge 30 and transmit the stored level of the flooding water to an external server; a power supply unit 50 installed in the second space 23 of the main body 20 and configured to supply power to the control unit 40 and the air contact type water level gauge 32; and a cover 60 configured to protectively cover the first space 22 and the second space 23 of the main body 20.

In the curb for measuring the flood depth in an urban area according to the present invention, the water level gauge 30 may include: a flooding water contact type water level gauge 31 configured to allow flooding water to be brought into close contact therewith to measure the level of the flooding water; and an air contact type water level gauge 32 configured to measure the internal air pressure thereof according to an increase or decrease in the flooding water.

In addition, in the curb for measuring the flood depth in an urban area according to the present invention, the air contact type water level gauge 32 may include: a fixing plate 33 formed to have a size corresponding to the opened top portion of the first space 22; a coupling member 34 coupled to an underside of the fixing plate 33 and having a screw thread 341 formed on the outer circumferential surface thereof; a cylindrical tube 35 having a hollow inner space 351 formed therein in a vertically penetrating manner so as to be screw-coupled to the coupling member 34; and a pressure sensor 36 coupled to an underside of the coupling member 34 and configured to measure the air pressure of the hollow inner space 351 of the cylindrical tube 35.

Further, in the curb for measuring the flood depth in an urban area according to the present invention, the air contact type water level gauge 32 may include an O-ring 37 disposed at a lower end of the screw thread 341 formed on the outer circumferential surface of the coupling member 34 so as to maintain airtightness between the coupling member 34 and the cylindrical tube 35 when the coupling member 34 is screw-coupled to the cylindrical tube 35.

In the curb for measuring the flood depth in an urban area according to the present invention, a bottom end of the cylindrical tube 35 may be formed so as to be spaced apart upwardly from the opened bottom portion of the first space 22 of the main body 20.

Advantageous Effects

As described above, the curb for measuring the flood depth in an urban area according to the present invention has an effect in that it is configured to demarcate the boundary between a vehicular roadway and a pedestrian sidewalk to measure the flood depth so that the flood depth in the urban area can be measured without the necessity for additional installation of a separate structure.

In particular, the curb for measuring the flood depth in an urban area according to the present invention has an effect in that an air contact type water level gauge is installed in a first space of a main body to measure the flood depth, i.e., the level of flooding water based on the internal air pressure of a cylindrical tube so that a pressure sensor is not brought into close contact with the flooding water to prevent corrosion of the pressure sensor, thereby reducing the maintenance and repair costs.

BRIEF DESCRIPTION OF THE DRAWINGS

The above and other objects, features and advantages of the present invention will be apparent from the following detailed description of the preferred embodiments of the invention in conjunction with the accompanying drawings, in which.

EXPLANATION ON SYMBOLS

Figure 1:
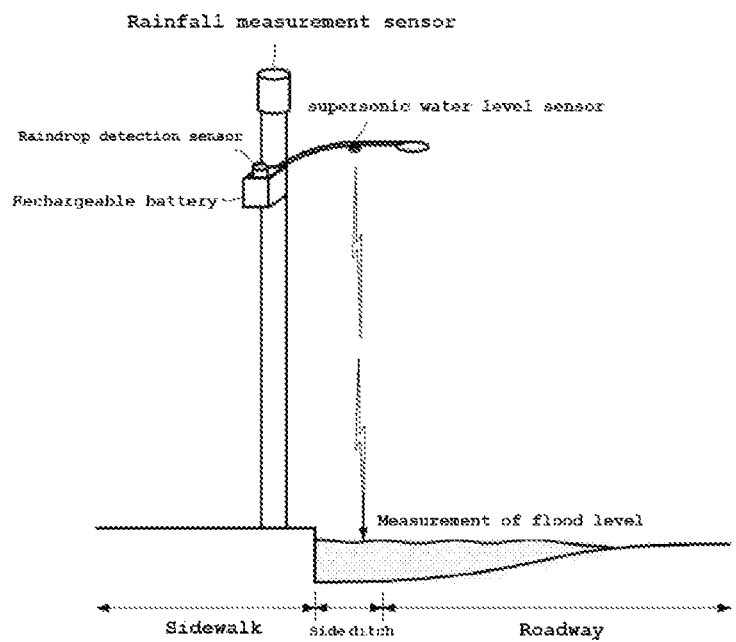
FIG. 1 is a diagrammatic view illustrating a conventional flood sensing apparatus according to the prior art.

10: curb for measuring the flood depth in an urban area
20: main body
21: partition member
22: first space
23: second space
30: water level gauge
31: flooding water contact type water level gauge
32: air contact type water level gauge
33: fixing plate
34: coupling member
35: cylindrical tube
36: pressure sensor
37: O-ring
40: control unit
50: power supply unit
60: cover

BEST MODE FOR CARRYING OUT THE INVENTION

Figure 2:
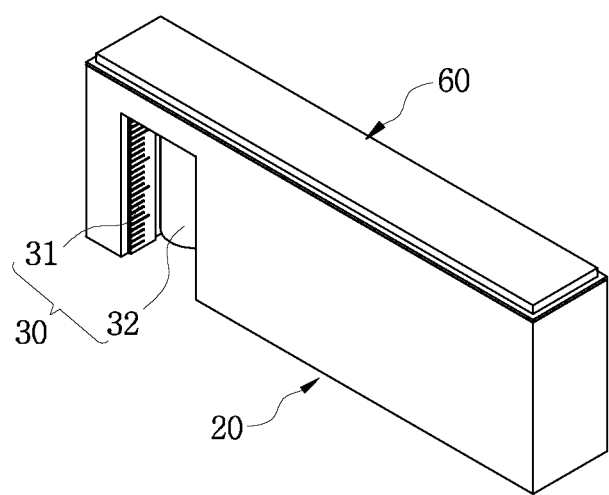
FIG. 2 is a top perspective view illustrating a curb for measuring the flood depth in an urban area according to a preferred embodiment of the present invention.
Figure 3:
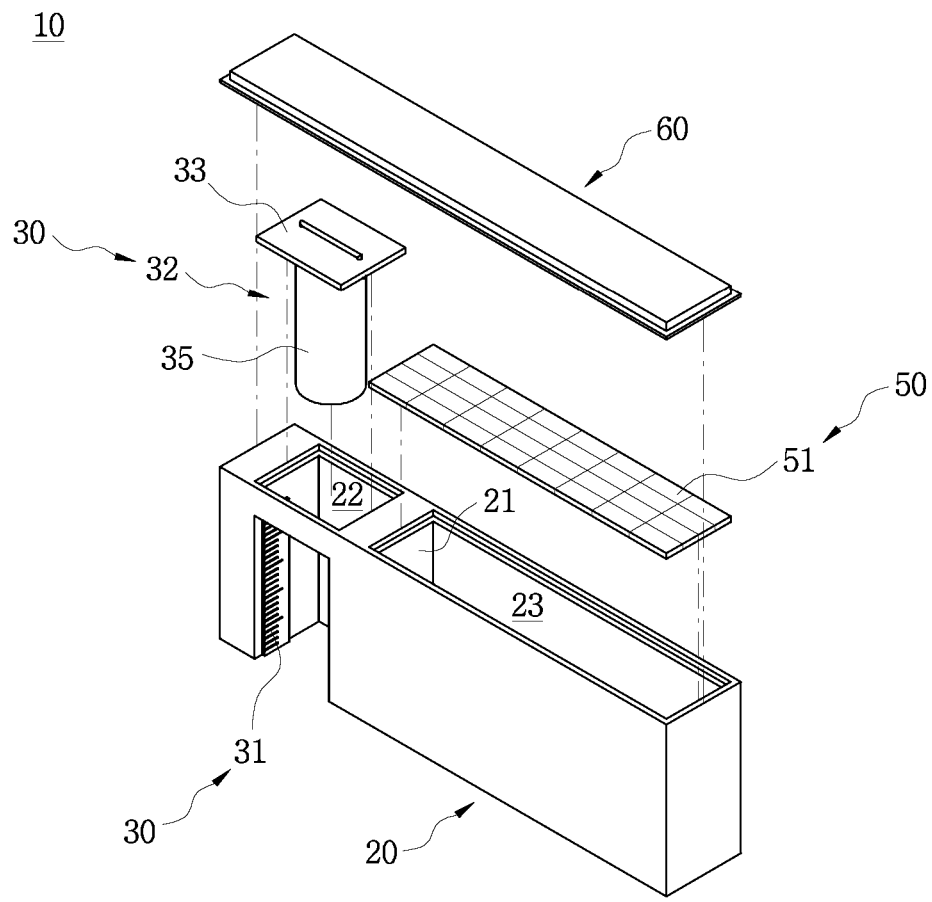
FIG. 3 is an exploded perspective view illustrating a curb for measuring the flood depth in an urban area according to a preferred embodiment of the present invention.
Figure 4:
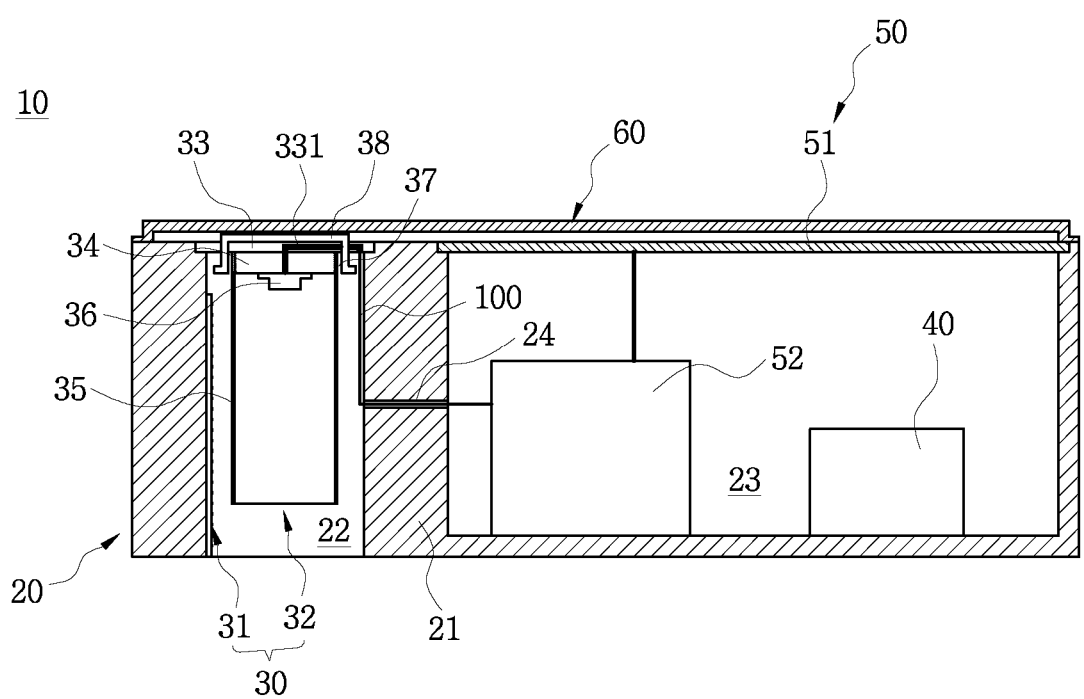
FIG. 4 is a cross-sectional view illustrating a curb for measuring the flood depth in an urban area according to a preferred embodiment of the present invention.
Figure 5:
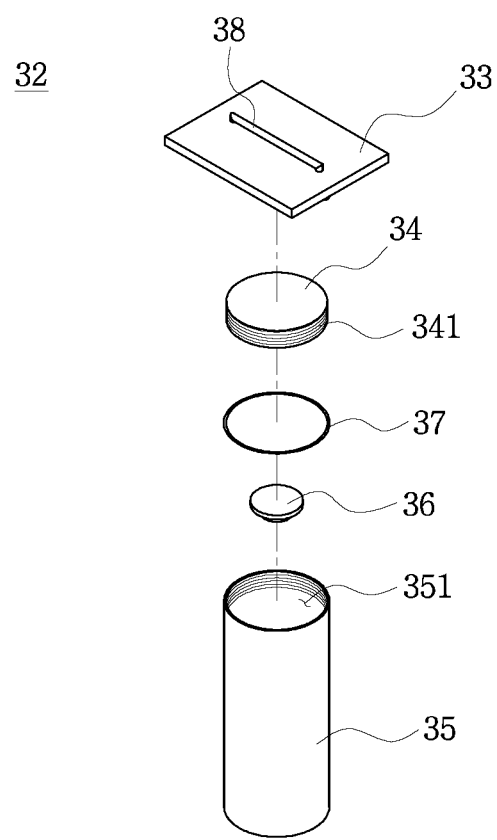
FIG. 5 is a top perspective view illustrating an air contact type water level gauge of a curb for measuring the flood depth in an urban area according to a preferred embodiment of the present invention.

Hereinafter, the preferred embodiment of the present invention will be described in further detail with reference to the accompanying drawings. In FIGS. 2 to 5, elements of performing the same function are denoted by the same reference numerals. In the meantime, in the detailed description and the accompanying drawings, illustration and explanation on the detailed technical construction and operation of elements, which have no direct connection with the technical features of the present invention, will be omitted, and only the technical constructions directly related with the present invention will be briefly illustrated and explained.

Referring to FIGS. 2 to 5, a curb 10 for measuring the flood depth in an urban area according to a preferred embodiment of the present invention includes a main body 20, a water level gauge 30, a control unit 40, a power supply unit 50, and a cover 60.

The main body 20 is an element that is a part of a curb that demarcates the boundary line between a vehicular roadway and a pedestrian sidewalk, and serves to accommodate the entire elements of the curb 10 of the present invention.

The main body 20 is formed in a rectangular parallelepiped box shape so that it is internally divided into a first space 22 and a second space 23 by a partition member 21, and the partition member 21 has a communicating passageway 24 formed therein to allow the first space 22 and the second space 23 to fluidically communicate with each other therethrough.

The first space 22 is opened at a top portion thereof, a bottom portion thereof and one side of a front portion thereof, which fluidically communicate with one another. The second space 23 is opened at a top portion thereof.

The water level gauge 30 is installed in the first space 22 of the main body 20 and serves to measure the level of water flooding into the first space 22 through the opened bottom portion of the first space 22 and the opened one side of the front portion of the first space 22. The water level gauge 30 includes a flooding water contact type water level gauge 31 that allows flooding water to be brought into close contact therewith to measure the level of the flooding water, and an air contact type water level gauge 32 that measures the internal air pressure thereof according to an increase or decrease in the flooding water.

The flooding water contact type water level gauge 31 is installed on one side of an inner wall of the first space 22 of the main body 20 to measure the level of flooding water rising from a bottom of the main body 20.

The air contact type water level gauge 32 functions to measure the internal air pressure thereof according to an increase or decrease in the level of water flooding into the first space 22 through the opened bottom portion of the first space 22 of the main body 20 and the opened one side of the front portion of the first space 22. The air contact type water level gauge 32 includes a fixing plate 33 formed to have a size corresponding to the opened top portion of the first space 22, a coupling member 34 coupled to an underside of the fixing plate 33 and having a screw thread 341 formed on the outer circumferential surface thereof, a cylindrical tube 35 having a hollow inner space 351 formed therein in a vertically penetrating manner so as to be screw-coupled to the coupling member 34, and a pressure sensor 36 coupled to an underside of the coupling member 34 and configured to measure the air pressure of the hollow inner space 351 of the cylindrical tube 35. In this case, a bottom end of the cylindrical tube 35 is formed so as to be spaced apart upwardly from the opened bottom portion of the first space 22 of the main body 20. This is to facilitate the introduction of flooding water into the first space 22 through the opened one side of the front portion of the first space 22.

In the meantime, the fixing plate 33 has an insertion hole 331 formed therein to allow an electric wire or cable 100 to be inserted thereto for the purpose of electrical connection between the pressure sensor 36 and the power supply unit 50. The electric wire or cable 100 is connected at one end thereof to the power supply unit 50 and is connected at the other end thereof to the pressure sensor 36 such that it passes through the communicating passageway 24 of the partition member 21 of the main body 20, and then the insertion hole 331 of the fixing plate 33 to allow the power supply unit 50 and the pressure sensor 36 to be electrically connected with each other.

In addition, the fixing plate 33 has a hand grip 38 longitudinally formed thereon so as to allow the fixing plate 33 to be easily detachably mounted to the opened top portion of the first space 22 of the main body 20.

By virtue of such a configuration, when flooding water is introduced into the cylindrical tube 35 though the opened bottom of the cylindrical tube 35, the internal air pressure of the cylindrical tube 35 is increased and the air contact type water level gauge 32 measures the increased internal air pressure of the cylindrical tube 35, and transmits the measured internal air pressure value to the control unit 340.

As described above, reliability of the measurement of the level of flooding water by the flooding water contact type water level gauge 31 and the air contact type water level gauge 32 can be improved through the mutual verification between the flooding water contact type water level gauge 31 and the air contact type water level gauge 32.

Meanwhile, the air contact type water level gauge 32 includes an O-ring 37 disposed at a lower end of the screw thread 341 formed on the outer circumferential surface of the coupling member 34 so as to maintain airtightness between the coupling member 34 and the cylindrical tube 35 when the coupling member 34 is screw-coupled to the cylindrical tube 35.

The control unit 40 is disposed in the second space 23 of the main body 20, and serves to store the level of the flooding water, measured by the water level gauge 30 and transmit the stored level of the flooding water to an external server (not shown). Further, the control unit 40 receives the internal air pressure of the cylindrical tube 35, measured by the air contact type water level gauge 32, from the pressure sensor 36, converts the received internal air pressure into a flood depth, and compares/verifies the level of the flooding water, measured by the flooding water contact type water level gauge 31 with the converted flood depth.

The power supply unit 50 is installed in the second space 23 of the main body 20 and serves to supply power to the control unit 40 and the air contact type water level gauge 32. The power supply unit 50 can be implemented as either a solar power supply unit including a solar cell module 51 and a battery 52, or a separate power supply device. In a preferred embodiment of the present invention, the power supply unit 50 is configured as the solar power supply unit. The solar power supply unit includes the solar cell module 51 that is configured to cover the opened top portion of the second space 23, and the battery 52 that is configured to accumulate and store energy collected by the solar cell module 51. Here, the solar power supply unit adopts a general configuration of accumulating solar light, and thus a detailed description thereof will be omitted to avoid redundancy.

The cover 60 is configured to protectively cover the first space 22 and the second space 23 of the main body 20, and serves to prevent flooding water from being introduced into the first and second spaces 22 and 23 through the opened top portions of the first and second spaces 22 and 23.

In the meantime, the cover 60 is made of a transparent material suitable for covering the first space 22 and the second space 23. This is to allow the solar cell module 51 to receive solar light the cover 60 in the case where the power supply unit 50 is implemented as the solar power supply unit.

As described above, according to the curb for measuring the flood depth in an urban area of the present invention, the curb is configured to demarcate the boundary between a vehicular roadway and a pedestrian sidewalk to measure the flood depth so that the flood depth in the urban area can be measured without the necessity for additional installation of a separate structure.

In particular, the curb for measuring the flood depth in an urban area according to the present invention has an effect in that an air contact type water level gauge is installed in a first space of a main body to measure the flood depth, i.e., the level of flooding water based on the internal air pressure of a cylindrical tube so that a pressure sensor is not brought into close contact with the flooding water to prevent corrosion of the pressure sensor, thereby reducing the maintenance and repair costs.

While the curb for measuring the flood depth in an urban area according to a preferred embodiment of the present invention has been described and illustrated in connection with specific exemplary embodiments with reference to the accompanying drawings, it will be readily appreciated by those skilled in the art that it is merely illustrative of the preferred embodiments of the present invention and various modifications and changes can be made thereto within the technical spirit and scope of the present invention.

Best Mode

According to features of the present invention for achieving the objects as described above, as a mode for carrying out the invention, there is provided a curb for measuring the flood depth in an urban area, including: a main body 20 configured to be divided into a first space 22 and a second space 23 by a partition member, the first space 22 being opened at a top portion thereof, a bottom portion thereof and one side of a front portion thereof, which fluidically communicate with one another, the second space 23 being opened at a top portion thereof, and the first space 22 and the second space 23 being partitioned by the partition member 21; a water level gauge 30 disposed in the first space 22 of the main body 20 and configured to measure the level of water flooding into the first space 22 through the opened bottom portion of the first space 22 and the opened one side of the front portion of the first space 22; a control unit 40 disposed in the second space 23 of the main body 20, and configured to store the level of the flooding water, measured by the water level gauge 30 and transmit the stored level of the flooding water to an external server; a power supply unit 50 installed in the second space 23 of the main body 20 and configured to supply power to the control unit 40 and the air contact type water level gauge 32; and a cover 60 configured to protectively cover the first space 22 and the second space 23 of the main body 20.

In the curb for measuring the flood depth in an urban area according to the present invention, as a mode for carrying out the invention, the water level gauge 30 may include: a flooding water contact type water level gauge 31 configured to allow flooding water to be brought into close contact therewith to measure the level of the flooding water; and an air contact type water level gauge 32 configured to measure the internal air pressure thereof according to an increase or decrease in the flooding water.

In addition, in the curb for measuring the flood depth in an urban area according to the present invention, as a mode for carrying out the invention, the air contact type water level gauge 32 may include: a fixing plate 33 formed to have a size corresponding to the opened top portion of the first space 22; a coupling member 34 coupled to an underside of the fixing plate 33 and having a screw thread 341 formed on the outer circumferential surface thereof; a cylindrical tube 35 having a hollow inner space 351 formed therein in a vertically penetrating manner so as to be screw-coupled to the coupling member 34; and a pressure sensor 36 coupled to an underside of the coupling member 34 and configured to measure the air pressure of the hollow inner space 351 of the cylindrical tube 35.

Further, in the curb for measuring the flood depth in an urban area according to the present invention, as a mode for carrying out the invention, the air contact type water level gauge 32 may include an O-ring 37 disposed at a lower end of the screw thread 341 formed on the outer circumferential surface of the coupling member 34 so as to maintain airtightness between the coupling member 34 and the cylindrical tube 35 when the coupling member 34 is screw-coupled to the cylindrical tube 35.

In the curb for measuring the flood depth in an urban area according to the present invention, as a mode for carrying out the invention, a bottom end of the cylindrical tube 35 may be formed so as to be spaced apart upwardly from the opened bottom portion of the first space 22 of the main body 20.

INDUSTRIAL APPLICABILITY

As described above, the curb for measuring the flood depth in an urban area according to the present invention has an effect in that it is configured to demarcate the boundary between a vehicular roadway and a pedestrian sidewalk to measure the flood depth so that the flood depth in the urban area can be measured without the necessity for additional installation of a separate structure.

In particular, the curb for measuring the flood depth in an urban area according to the present invention is expected to be widely used in a wide range of industrial applications since the inventive curb has an effect in that an air contact type water level gauge is installed in a first space of a main body to measure the flood depth, i.e., the level of flooding water based on the internal air pressure of a cylindrical tube so that a pressure sensor is not brought into close contact with the flooding water to prevent corrosion of the pressure sensor, thereby reducing the maintenance and repair costs.

The invention claimed is:

1. A curb for measuring a flood depth in an urban area, comprising:
    a main body (20) configured to be divided into a first space (22) and a second space (23) by a partition member, the first space (22) being opened at a top portion thereof, a bottom portion thereof and one side of a front portion thereof, which fluidically communicate with one another, the second space (23) being opened at a top portion thereof, and the first space (22) and the second space (23) being partitioned by the partition member (21);
    a water level gauge (30) disposed in the first space (22) of the main body (20) and configured to measure a level of water flooding into the first space (22) through the opened bottom portion of the first space (22) and the opened one side of the front portion of the first space (22);
    a control unit (40) disposed in the second space (23) of the main body (20), and configured to store the level of the flooding water, measured by the water level gauge (30) and transmit the stored level of the flooding water to an external server;
    a power supply unit (50) installed in the second space (23) of the main body (20) and configured to supply power to the control unit (40) and the water level gauge (30); and
    a cover (60) configured to protectively cover the first space (22) and the second space (23) of the main body (20).

2. The curb for measuring the flood depth in an urban area according to claim 1, wherein the water level gauge (30) comprises:
    a flooding water contact type water level gauge (31) configured to allow flooding water to be brought into direct contact therewith to measure the level of the flooding water; and
    an air contact type water level gauge (32) configured to measure an internal air pressure thereof according to an increase or decrease in the level of the flooding water.

3. The curb for measuring the flood depth in an urban area (20) according to claim 2, wherein the air contact type water level gauge (32) comprises:
    a fixing plate (33) formed to have a size corresponding to the opened top portion of the first space (22);
    a coupling member (34) coupled to an underside of the fixing plate (33) and having a screw thread (341) formed on an outer circumferential surface thereof;
    a cylindrical tube (35) having a hollow inner space (351) formed therein in a vertically penetrating manner so as to be screw-coupled to the coupling member (34); and
    a pressure sensor (36) coupled to an underside of the coupling member (34) and configured to measure the air pressure of the hollow inner space (351) of the cylindrical tube (35).

4. The curb for measuring the flood depth in an urban area according to claim 3, wherein the air contact type water level gauge (32) comprises an O-ring (37) disposed at a lower end of the screw thread (341) formed on the outer circumferential surface of the coupling member (34) so as to maintain airtightness between the coupling member (34) and the cylindrical tube (35) when the coupling member (34) is screw coupled to the cylindrical tube (35).

5. The curb for measuring the flood depth in an urban area according to claim 3, wherein a bottom end of the cylindrical tube (35) is formed so as to be spaced apart upwardly from the opened bottom portion of the first space (22) of the main body (20).

\* \* \* \* \*